(12) United States Patent
Peng et al.

(10) Patent No.: US 10,139,553 B2
(45) Date of Patent: Nov. 27, 2018

(54) BACKLIGHT MODULE AND DISPLAY DEVICE

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventors: Jingdan Peng, Beijing (CN); Wenjun Li, Beijing (CN); Xiaozeng Pei, Beijing (CN)

(73) Assignees: BOE TECHNOLOGY GROUP CO., LTD., Beijing (CN); BOE OPTICAL SCIENCE AND TECHNOLOGY CO., LTD., Suzhou, Jiangsu (CN)

( * ) Notice: Subject to any disclaimer, the term of this patent is extended or adjusted under 35 U.S.C. 154(b) by 335 days.

(21) Appl. No.: 14/801,128

(22) Filed: Jul. 16, 2015

(65) Prior Publication Data

US 2016/0209581 A1 Jul. 21, 2016

(30) Foreign Application Priority Data

Jan. 15, 2015 (CN) .......................... 2015 1 0020935

(51) Int. Cl.
*F21V 8/00* (2006.01)
(52) U.S. Cl.
CPC .......... *G02B 6/0088* (2013.01); *G02B 6/0095* (2013.01); *G02B 6/005* (2013.01); *G02B 6/0093* (2013.01)
(58) Field of Classification Search
CPC .... G02B 6/005; G02B 6/0085; G02B 6/0093; G02B 6/0095; G02B 6/088
See application file for complete search history.

(56) References Cited

U.S. PATENT DOCUMENTS

2003/0164913 A1 9/2003 Ogawa
2005/0099604 A1* 5/2005 Mizumaki ............ G02B 6/0086
353/27 R
(Continued)

FOREIGN PATENT DOCUMENTS

CN 1442734 A 9/2003
CN 102352986 A 2/2012
(Continued)

OTHER PUBLICATIONS

First Chinese Office Action dated May 26, 2016; Appln. No. 201510020935.0.

(Continued)

*Primary Examiner* — Stephen F Husar
(74) *Attorney, Agent, or Firm* — Ladas & Parry LLP

(57) ABSTRACT

A backlight module and a display device are provided. The backlight module comprises a light guide plate, a sealant frame enclosing edges of the light guide plate, and a light source disposed at an end of the light guide plate. The light guide plate has a near light end near the light source and a far light end further away from the light source. The light guide plate includes at least one first positioning structure at the far light end. The sealant frame includes at least a second positioning structure disposed at a position corresponding to the first positioning structure at the far light end. The first positioning structure and the second positioning structure are engaged with each other to position the light guide plate on a plane parallel to a light emitting surface of the light guide plate.

16 Claims, 2 Drawing Sheets

(56) References Cited

U.S. PATENT DOCUMENTS

2007/0267564 A1    11/2007    Ohno et al.
2010/0259949 A1    10/2010    Ye et al.
2012/0249406 A1*  10/2012    Tanaka .................... G09G 3/36
                                                                                   345/102

FOREIGN PATENT DOCUMENTS

| CN | 102748656 A | 10/2012 |
| CN | 203012175 U | 6/2013 |
| CN | 203082698 U | 7/2013 |
| CN | 103644488 A | 3/2014 |
| CN | 203478029 U | 3/2014 |
| CN | 103697414 A | 4/2014 |
| CN | 203825325 U | 9/2014 |
| JP | 2012015000 A | 1/2012 |

OTHER PUBLICATIONS

Second Chinese Office Action dated Nov. 17, 2016; Appln. No. 201510020935.0.
The Fourth Chinese Office Action dated Nov. 13, 2017; Appln. No. 201510020935.0.

\* cited by examiner

BACKLIGHT MODULE AND DISPLAY DEVICE

FIELD

The present disclosure is related to a backlight module and a display device including the backlight module.

BACKGROUND

A liquid crystal display module includes a display panel and a backlight module stacked together. Since the display panel alone could not emit lights, it is necessary for the backlight module to supply desired lights to the display panel to display image, thus display effect of the liquid crystal display module is directly affected by light emitting effect of the backlight module. As there are more demands on light weight, compactness and high brightness of the liquid crystal display module, ultra thin thickness and high brightness have become developing trends for the backlight module products.

As shown in FIG. 1, a backlight module known by the present inventors includes a light guide plate 101 and a sealant frame 103. A plurality of snap lugs 102 are disposed at edges on both sides of the light guide plate 101, and the sealant frame 103 is designed with a plurality of grooves 104. Typically, when the light guide plate 101 and the sealant frame 103 are assembled, the snap lugs 102 are inserted in the grooves 104 of the sealant frame 103 respectively to position and fix the light guide plate 101. However, since the snap lugs 102 are located at the edges on both sides of the light guide plate 101, some of them are positioned relatively close to lattice points (not shown in Figs) on the light guide plate 101, thereby causing problems such as bright spots, bright lines, rough edges and so on at the snap lugs 102, which in turn affects display quality of the liquid crystal display module.

SUMMARY

A backlight module and a display device according to the present disclosure are provided to eliminate problems such as bright spots, bright lines, rough edges and so on caused by snap lugs disposed at side edges of a light guide plate, thereby increasing display quality of the display device.

In one aspect, there is provided a backlight module comprising a light guide plate, a sealant frame enclosing edges of the light guide plate, and a light source disposed at an end of the light guide plate. The light guide plate has a near light end near the light source and a far light end further away from the light source. The light guide plate includes at least one first positioning structure at the far light end. The sealant frame includes at least a second positioning structure disposed at a position corresponding to the first positioning structure at the far light end. The first positioning structure and the second positioning structure are engaged with each other to position the light guide plate on a plane parallel to a light emitting surface of the light guide plate.

In one example, the first positioning structure is a snap lug protruded from an end surface of the far light end, and the second positioning structure is an "L" shape groove into which the snap lug is inserted.

In one example, the groove has a depth greater than a thickness of the light guide plate by 0.03 mm~0.1 mm.

In one example, the first positioning structure is a strip structure protruding from an end surface of the far light end. The strip structure has a length the same as a dimension of the far light end of the light guide plate, and a thickness smaller than a thickness of the light guide plate, and has a surface flush with a light emitting surface of the light guide plate. The second positioning structure is an "L" shape groove, into which the strip structure is inserted.

In one example, two edges of the light guide plate located between the near light end and the far light end are two side edges. The sealant frame comprises a protrusion in a portion corresponding to the side edges of the light guide plate. The protrusion is located on a side of a light emitting surface of the light guide plate so as to fix the light guide plate in a direction perpendicular to a plane parallel to light emitting surface of the light guide plate.

In one example, the protrusion of the sealant frame is located near the light source.

In one example, at least one protrusion is disposed on either side edge.

In one example, the backlight module further comprises a multilayer optical film stacked on the side of the light emitting surface of the light guide plate, and the optical film makes room for the protrusion accordingly so that the optical film covers the light guide plate evenly.

In one example, the light guide plate comprises a blank region at the far light end. The blank region comprises no lattice point and takes 0.5%~1% of surface area of the light guide plate.

A display device according to the present disclosure is further provided. The display device comprises a backlight module as described above.

In the backlight module and the display device according to the present disclosure, the snap lugs at two side edges of the light guide plate of the backlight module are eliminated so that the positioning structure is disposed at the far light end of the light guide plate. Since the density of the lattice points on the light guide plate reduce gradually from the near light end to the far light end so that almost no lattice points exist at the far light end of the light guide plate, the positioning structure disposed at the far light end of the light guide plate could increase the distance between the positioning structure and the lattice points, thus eliminating problems such as bright spots, bright lines, rough edges and so on due to the snap lugs disposed at side edges of the light guide plate, which increases display quality of the display device.

BRIEF DESCRIPTION OF THE DRAWINGS

A simple explanation will be made to the attached drawings used in the embodiments in the following so as to describe the technical solutions in the embodiments of the present disclosure. It is obvious that the drawings in the following description are only some embodiments of the present disclosure, and various other drawings can be obtained by those of ordinary skilled in the art without creative labor based on these drawings mention above.

DETAILED DESCRIPTION

Technical solutions according to the embodiments of the present disclosure will be described clearly and completely as below in combination with the drawings of the embodiments of the present invention. It is understood that the described embodiments are only a part of but not all of exemplary embodiments of the present disclosure. Based on the embodiments in the present disclosure, various other embodiments can be obtained by those of ordinary skilled in the art without creative labor and those embodiments shall fall into the protection scope of the present disclosure.

First Embodiment

Figure 2:
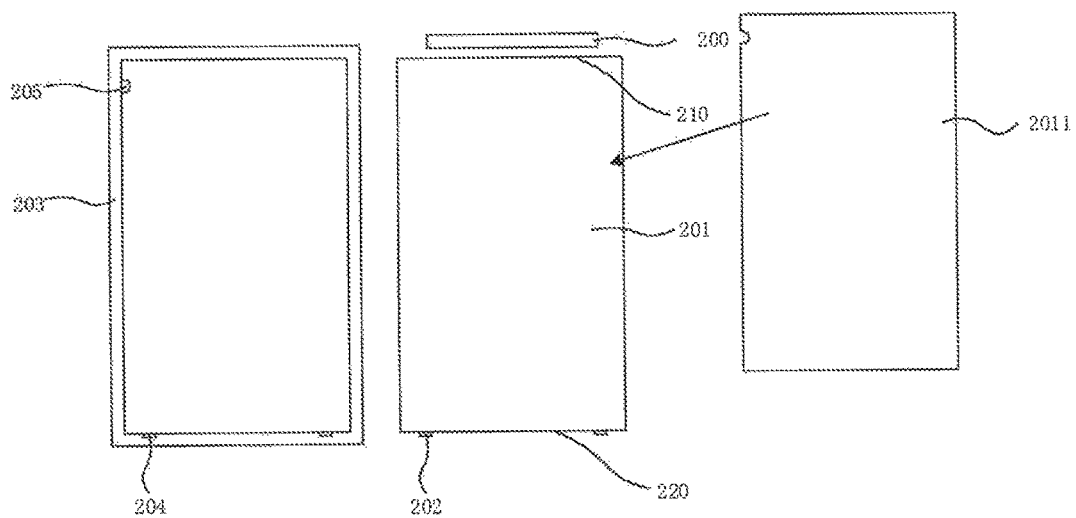
FIG. 2 is a structural view of a light guide plate and a sealant frame in a backlight module according to a first embodiment of the present disclosure.

A backlight module is provided according to the present embodiment. As shown in FIG. 2, the backlight module comprises a light guide plate 201, a sealant frame 203 enclosing edges of the light guide plate 201, and a light source 200 disposed at an end of the light guide plate 201. The light guide plate 201 has a near light end 210 near the light source, and a far light end 220 further away from the light source. The far light end 220 of the light guide plate 201 is provided with a first positioning structure(s) 202. The sealant frame 203 is provided with a second positioning structure(s) 204 at a position corresponding to the first positioning structure 202. The first positioning structure 202 and the second positioning structure 204 are engaged with each other to position the light guide plate 201 on a plane parallel to a light emitting surface of the light guide plate 201. It is noted that there is no positioning structure existed at near light end 210 of the light guide plate 201.

Figure 1:
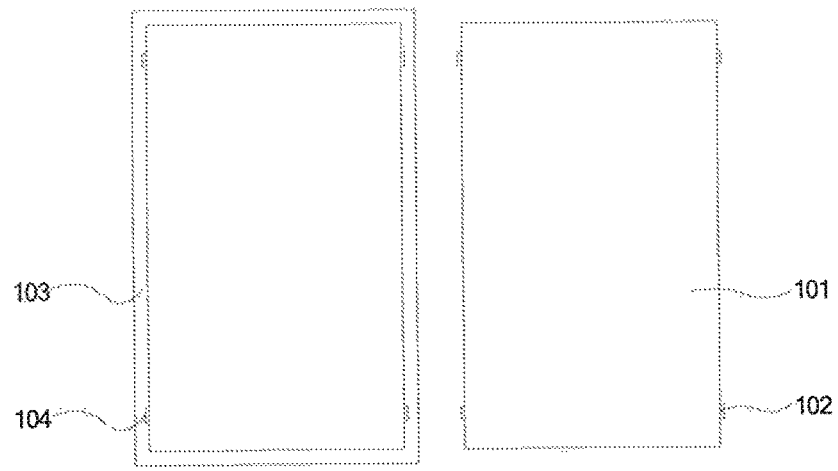
FIG. 1 is a structural view of a light guide plate and a sealant frame in a backlight module known by the present inventors.

In comparison with the technical solution shown in FIG. 1, the backlight module according to the present embodiment eliminates snap lugs on two side edges of the light guide plate 201 of the backlight module, and a positioning structure is disposed only at the far light end 220 of the light guide plate 201. Since the lattice points (not shown) density on the light guide plate 201 reduces gradually from the near light end 210 to the far light end 220 so that almost no lattice points exists at the far light end 220 of the light guide plate 201, the positioning structure disposed at the far light end 220 of the light guide plate 201 enable a longer distance between the positioning structure and the lattice points, thereby eliminating problems such as bright spots, bright lines, rough edges and so on caused by the snap lugs disposed at side edges of the light guide plate 201, which increases light emitting quality of the backlight unit.

The first positioning structure and the second positioning structure according to the present disclosure are not limited thereto. As shown in FIG. 2, the first positioning structure 202 is a snap lug protruded from an end surface of the far light end 220 of the light guide plate 201, the second positioning structure 204 is an "L" shape groove located at an end surface of the sealant frame 203 corresponding to the far light end 220 of the light guide plate 201. The "L" shape groove corresponds to the snap lug in position so that the snap lug can be inserted into the corresponding groove.

The first positioning structure 201 and the second positioning structure 202 as described above can fix the light guide plate 201 in a direction parallel to a plane of the light emitting surface of the light guide plate 201. Since both the first positioning structure 201 and the second positioning structure 202 are disposed at the far light end 220 of the light guide plate 201, problems such as bright spots, bright lines, and rough edges caused by the snap lugs disposed on side edges of the light guide plate 201 can be eliminated.

In order to improve the stability of the light guide plate 201 in a direction parallel to the light emitting surface of the light guide plate 201, there are preferably at least two the snap lugs and the corresponding grooves.

If there are a plurality of the snap lugs and corresponding grooves, the snap lugs can be disposed in symmetry with regard to a center point of far light end of the light guide plate so as to increase light uniformity emitted from the backlight module.

For example, the groove has a depth greater than a thickness of the light guide plate 201 by 0.03 mm~0.1 mm, so that the light guide plate 201 has a good stability in the direction parallel to the light emitting surface of the light guide plate 201 after mounting the light guide plate 201 on the sealant frame 203.

In the present embodiment, two edges in the light guide plate 201 located between the near light end 210 and the far light end 220 are referred as two side edges of the light guide plate 201. Optionally, a protrusion 205 is disposed in a portion of the sealant frame 203 corresponding to the side edge the light guide plate 201, and the protrusion 205 is located on a side of a light emitting surface of the light guide plate 201 to fix the light guide plate 201 in a direction perpendicular to the light emitting surface of the light guide plate 201, in order to prevent the light guide plate 201 from flopping, or even disengaging in the direction perpendicular to the light emitting surface of the light guide plate 201. That is, the protrusion 205 located on the light guide plate restricts a degree of freedom of displacement of the light guide plate 201 in the direction perpendicular to the light emitting surface the light guide plate 201. As such, even after eliminating snap lugs on the two side edges of the light guide plate, stability of the assembly of the light guide plate and the sealant frame can still be ensured. In a vibrating test, it is not easy to flop the light guide plate to cause degradation of the optical property.

It is noted that if the sealant frame 203 is provided with the protrusion 205, in case that the light guide plate 201 and the sealant frame 203 are assembled, the light guide plate 201 may be inserted into the sealant frame 203 obliquely.

The protrusion 205 can be disposed not only on the left side edge of the sealant frame 203 as shown in FIG. 2, but also on the right side edge of the sealant frame 203, or on both the left side edge and the right side edge in other embodiments of the present disclosure. The present disclosure does not limited thereto. The number of the protrusion disposed on the side edge can be determined based on actual conditions such as size of the backlight module.

For example, the protrusion 205 can be located at a position near the light source, so that the protrusion can be covered by shielding adhesive tape (not shown) disposed at the near light end 210 to ensure a good light emitting quality of the backlight module.

The backlight module can further include a multilayer optical films 2011 stacked on the side of the light emitting surface of the light guide plate 201. The optical film can make room for the protrusions 202 accordingly so that the optical film can cover the light guide plate evenly.

It is noted that the backlight module having the snap lugs and the grooves according to the present embodiment is especially suitable for a backlight module with a size greater than 5.5 inches. This is because the backlight module with a size greater than 5.5 inches requires a light guide plate with a thickness greater than that with a size smaller than 5.5 inches, it is easy to fabricate the snap lugs at the far light end of the light guide plate.

Second Embodiment

Figure 3:
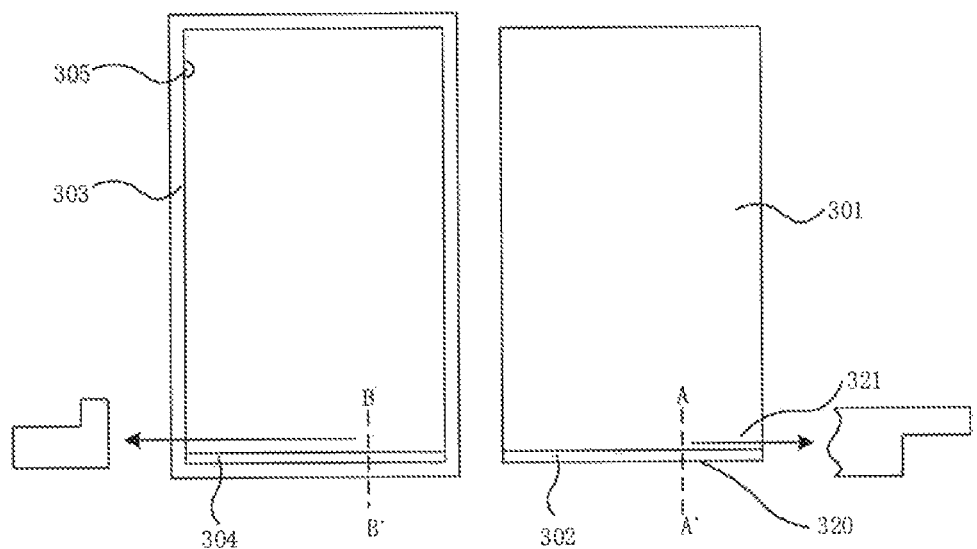
FIG. 3 is a structural view of a light guide plate and a sealant frame in a backlight module according to a second embodiment of the present disclosure.

The present embodiment provides another implementation of the first positioning structure and the second positioning structure. As shown in FIG. 3, the first positioning structure 302 is for example a strip structure protruding from an end surface of the far light end 320 of the light guide plate 301. FIG. 3 also shows cross section shape of the first positioning structure 302 taken along line A-A'. The first positioning structure 302 has a length the same as a dimension of the far light end 320 of the light guide plate 301 such as a width of the light guide plate at the far light end 320, a thickness small than that of the light guide plate 301, and has a surface flush with the light emitting surface of the light guide plate 301. The second positioning structure 304 is an "L" groove located on the sealant frame 303. FIG. 3 also shows cross section shape of the second positioning structure 304 taken along line B-B'. The strip structure 302 can be inserted into the corresponding groove 304.

With the above first positioning structure 302 and second positioning structure 304, the sealant frame 303 and the light guide plate 301 can be fixed in a direction parallel to the light emitting surface of the light guide plate 301. Both of the first positioning structure 302 and second positioning structure 304 are disposed at the far light end 320 of the light guide plate 301, thereby eliminating problems such as bright spots, bright lines, rough edges, and so on.

In the backlight module according to the present embodiment, a protrusion 305 may also be disposed in a portion of the sealant frame 303 corresponding to a side edge of the light guide plate 301. The protrusion 305 is located on a side of a light emitting surface of the light guide plate 301 in order to lock the light guide plate 301 at the light emitting surface of the light guide plate 301, so that the light guide plate 301 is fixed between the sealant frame 303 and the protrusion 305 in order to prevent the light guide plate 301 from flopping, or even disengaging in a direction perpendicular to the light emitting surface of the light guide plate 301.

It is noted that the backlight module according to the present embodiment is especially suitable for the backlight module with a size smaller than 5.5 inches. This is because the backlight module with a size smaller than 5.5 inches requires a light guide plate with a thickness smaller than that with a size greater than 5.5 inches, it is easier to fabricate a first positioning structure with a strip structure shown in FIG. 3 than a first positioning structure with a snap lug structure at the far light end of the light guide plate.

Furthermore, for a backlight module with smaller size, the small inlet for the sealant on the light guiding plate might lead to xanthation. In the backlight module according to the present embodiment, by disposing a wider blank region 321 comprising no lattice points at the far light end of the light guide plate and making room at corresponding positions on the sealant frame, the inlet can be covered by the sealant frame, thereby solving the problem of xanthation caused by small inlet, which further increases light emitting quality of the backlight module.

In the above backlight module, the blank region preferably take 0.5%~1% of that surface area of the light guide plate so that it will not affect the light emitting effect of the light guide plate adversely.

Third Embodiment

A display device according to the present embodiment comprises a backlight module according to the first embodiment and the second embodiment. Since a positioning structure of the backlight module is disposed at a far light end of a light guide plate, there are no problems such as a bright spots, bright lines, rough edges and so on caused by snap lugs disposed at side edges of a light guide plate, thus increasing light emitting quality of the backlight module, which in turn increases display quality of a display device.

The above embodiments are only for explaining the present disclosure and in no way limit the present disclosure. Those of ordinary skilled in the art can make various variations and modifications to the present disclosure without departure from the spirit and the scope of the present disclosure, thereby all equivalent technical solutions are intended to be included within the scope of the present disclosure as defined by the claims.

What is claimed is:

1. A backlight module comprising
a light guide plate,
a sealant frame enclosing edges of the light guide plate, and
a light source disposed at an end of the light guide plate,
wherein the light guide plate has a near light end near the light source and a far light end further away from the light source, the light guide plate comprises at least one first positioning structure at the far light end, the sealant frame comprises at least a second positioning structure disposed at a position corresponding to the first positioning structure at the far light end, and the first positioning structure and the second positioning structure are engaged with each other to position the light guide plate on a plane parallel to a light emitting surface of the light guide plate;
wherein the light guide plate comprises a blank region at the far light end, the blank region taking 0.5%~1% of a surface area of the light guide plate.

2. The backlight module according to claim 1, wherein the first positioning structure is a snap lug protruded from an end surface of the far light end, and the second positioning structure is an "L" shape groove into which the snap lug is inserted.

3. The backlight module according to claim 2, wherein the groove has a depth greater than a thickness of the light guide plate by 0.03 mm~0.1 mm.

4. The backlight module according to claim 1, wherein the first positioning structure is a strip structure protruding from an end surface of the far light end, the strip structure having a length the same as a dimension of the far light end of the light guide plate, and a thickness smaller than a thickness of the light guide plate, and having a surface flush with a light emitting surface of the light guide plate, and the second positioning structure is an "L" shape groove, into which the strip structure is inserted.

5. A backlight module comprising
a light guide plate,
a sealant frame enclosing edges of the light guide plate, and
a light source disposed at an end of the light guide plate,
wherein the light guide plate has a near light end near the light source and a far light end further away from the light source, the light guide plate comprises at least one first positioning structure at the far light end, the sealant frame comprises at least a second positioning structure disposed at a position corresponding to the first positioning structure at the far light end, and the first positioning structure and the second positioning structure are engaged with each other to position the light guide plate on a plane parallel to a light emitting surface of the light guide plate;
wherein two edges of the light guide plate located between the near light end and the far light end are two side edges, the sealant frame comprises a protrusion in a portion corresponding to the side edges, the protrusion is located on a side of a light emitting surface of the light guide plate so as to fix the light guide plate in a direction perpendicular to a plane parallel to light emitting surface of the light guide plate.

6. The backlight module according to claim 5, wherein the protrusion of the sealant frame is located near the light source.

7. The backlight module according to claim 5, wherein at least one protrusion is disposed on either side edge.

8. The backlight module according to claim 5, wherein the backlight module further comprises a multilayer optical film stacked on the side of the light emitting surface of the light guide plate, and the optical film makes room for the protrusion accordingly so that the optical film covers the light guide plate evenly.

9. A display device comprising a backlight module,
the backlight module comprising
a light guide plate,
a sealant frame enclosing edges of the light guide plate, and
a light source disposed at an end of the light guide plate,
wherein the light guide plate has a near light end near the light source and a far light end further away from the light source, the light guide plate comprises at least one first positioning structure at the far light end, the sealant frame comprises at least a second positioning structure disposed at a position corresponding to the first positioning structure at the far light end, and the first positioning structure and the second positioning structure are engaged with each other to position the light guide plate on a plane parallel to a light emitting surface of the light guide plate;
wherein the light guide plate comprises a blank region at the far light end, the blank region taking 0.5%~1% of the surface area of the light guide plate.

10. The display device according to claim 9, wherein the first positioning structure is a snap lug protruded from an end surface of the far light end, and the second positioning structure is an "L" shape groove into which the snap lug is inserted.

11. The display device according to claim 10, wherein the groove has a depth greater than a thickness of the light guide plate by 0.03 mm~0.1 mm.

12. The display device according to claim 9, wherein the first positioning structure is a strip structure protruding from an end surface of the far light end, the strip structure having a length the same as a dimension of the far light end of the light guide plate, and a thickness smaller than a thickness of the light guide plate, and having a surface flush with a light emitting surface of the light guide plate, and the second positioning structure is an "L" shape groove, into which the strip structure is inserted.

13. The display device according to claim 9, wherein two edges of the light guide plate located between the near light end and the far light end are two side edges, the sealant frame is provided with a protrusion in a portion corresponding to the side edges, the protrusion is located on a side of a light emitting surface of the light guide plate so as to fix the light guide plate in a direction perpendicular to a plane of the light guide plate.

14. The display device according to claim 13, wherein the protrusion of the sealant frame is located near the light source.

15. The display device according to claim 13, wherein at least one protrusion is disposed on either side edge.

16. The display device according to claim 13, wherein the backlight module further comprises a multilayer optical film stacked on the side of the light emitting surface of the light guide plate, and the optical film makes room for the protrusion accordingly so that the optical film covers the light guide plate evenly.

* * * * *